United States Patent [19]

Gray

[11] Patent Number: 5,082,200
[45] Date of Patent: Jan. 21, 1992

[54] METHOD OF GUIDING AN IN-FLIGHT VEHICLE TOWARD A TARGET

[75] Inventor: Roger L. Gray, King George, Va.

[73] Assignee: The United States of America as represented by the Secretary of the Navy, Washington, D.C.

[21] Appl. No.: 620,671

[22] Filed: Dec. 3, 1990

[51] Int. Cl.$^5$ .............................. F41G 7/00
[52] U.S. Cl. ................................ 244/3.15
[58] Field of Search .............. 244/3.15, 3.16, 3.19

[56] References Cited

U.S. PATENT DOCUMENTS

| | | | |
|---|---|---|---|
| 2,992,423 | 7/1961 | Floyd et al. | 244/3.15 |
| 3,603,531 | 9/1971 | Brucker-Steinkuhl | 244/3.16 |
| 3,952,304 | 4/1976 | Broniwitz et al. | 343/16 M |
| 4,018,405 | 4/1977 | Baker | 244/3.14 |
| 4,347,996 | 9/1982 | Grosso | 244/3.16 |
| 4,511,219 | 4/1985 | Giles et al. | 350/388 |
| 4,823,299 | 4/1989 | Chang et al. | 364/735 |
| 4,855,932 | 8/1989 | Cangiani et al. | 364/516 |

OTHER PUBLICATIONS

"A Guidance Technique for the Space Intercept of Ballistic Targets", 3/91, NAVSWC.

*Primary Examiner*—Charles T. Jordan
*Attorney, Agent, or Firm*—John D. Lewis; Kenneth F. Walden

[57] ABSTRACT

A method of guiding an in-flight vehicle toward a target exhibiting a known or predictable thrusting profile is provided. The vehicle undergoes an alternating series of vehicle coasts and diverts during the vehicle's terminal intercept phase of flight. Position and velocity information of the target with respect to the vehicle is used to select a course change during each vehicle coast. The course change is intentionally offset from a collision course with the target and is effected by the next divert in the series. The amount of offset is such that the final coast results in a target intercept.

8 Claims, 2 Drawing Sheets

METHOD OF GUIDING AN IN-FLIGHT VEHICLE TOWARD A TARGET

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The present invention relates generally to a guidance method and more particularly to a method of guiding an in-flight vehicle toward an intercept with a target exhibiting a known or predictable thrust profile.

BACKGROUND OF THE INVENTION

There are two fundamentally different techniques to guide a missile to a target. The first approach, called the proportional navigation technique, is commonly used because of its simplicity and effectiveness in many applications. Most notably, the proportional navigation approach is used in complex intercept situations, where numerous system errors are present or the target is moving in an unpredictable way. The second approach, called the filter/guidance law approach has certain advantages over the proportional navigation approach for targets that are not thrusting and are undergoing no aerodynamic effects, such as a satellite. In such a case, the system errors required to accurately model the intercept are few in number since the target exhibits a known or predictable thrust profile. The filter/guidance law approach determines information about the intercept (such as target position and velocity) using a guidance filter and utilizes this information, in a way defined by a guidance law, to direct the missile to the target.

The function of a filter/guidance law approach used during the terminal intercept phase of flight is to direct an in-flight vehicle to an accurate intercept of a target. The terminal intercept phase begins at target acquisition and ends when the vehicle intercepts the target. The filter/guidance law approach can be subdivided into the performance of two distinct tasks: the accurate determination of the position and velocity of the target relative to the vehicle and the use of this information to direct the vehicle. The relative position and velocity of the target can be determined using a Kalman filter or some equivalent technique. This aspect of the filter/guidance law approach is addressed in applicant's patent entitled "A Method of Kalman Filtering For Estimating the Position and Velocity of a Tracked Object," U.S. Pat. No. 5,051,751, issued Sept. 24, 1991. The second task, the utilization of the relative position and velocity information to direct the vehicle to the target, is referred to hereinafter as a guidance law or method.

The effectiveness of any guidance law relies greatly on the generation of estimated time of impact information in order to schedule events. No guidance law is presently capable of using simple passive devices for generating an estimated time of impact. Currently, existing guidance laws obtain this information through the use of active laser or radar systems. However, use of these systems adds weight and complexity to the design of the missile. Furthermore, numerous guidance laws have been developed for guiding liquid fuel motor driven missiles. Unfortunately, liquid fuel is quite toxic and is therefore unsafe in many stowage, handling and operations applications. Solid fuel, on the other hand, is relatively safe. The primary disadvantage of solid fuel motors is that each burn imparts a thrust of a predetermined magnitude. Unlike a liquid fuel, once a solid fuel is ignited, the magnitude and duration of the burn is difficult to alter. This poses a significant constraint on the capability of the vehicle and the design of the guidance law.

SUMMARY OF THE INVENTION

Accordingly, it is an object of the present invention to provide a method of guiding an in-flight vehicle toward an intercept with a target exhibiting a known or predictable thrust profile.

Another object of the present invention is to provide a method of guiding an in-flight vehicle equipped with solid fuel motors for altering the vehicle's course during the vehicle's terminal intercept phase of flight.

Still another object of the present invention is to provide a method of guiding an in-flight vehicle that relies on simple passive sensing techniques to generate estimated time of impact information.

Other objects and advantages of the present invention will become more obvious hereinafter in the specification and drawings.

In accordance with the present invention, a method is provided for guiding an in-flight vehicle toward an intercept with a target exhibiting a known or predictable thrust profile. The target is acquired by means of a sensing device mounted on the vehicle. Once acquired, the vehicle has entered the terminal intercept phase of flight during which time the vehicle undergoes a series of I vehicle coasts and (I-1) vehicle diverts. During the terminal intercept phase, position and velocity information of the target with respect to the vehicle are provided. An offset trajectory for the vehicle is selected during the first (I-1) vehicle coasts based upon the position and velocity information. Each offset trajectory is offset from a collision course with the target. The magnitude of the offset is defined by a distance between the vehicle and the target when a projected trajectory of the vehicle is at a closest approach with the target. The magnitude of the offset decreases with each vehicle coast in the series such that, during the I-th vehicle coast the magnitude is: 1) related to the radius of an intercept enhancement device if the vehicle is equipped such a device or 2) equal to zero if the vehicle is not equipped with an intercept enhancement device. The vehicle is diverted at each of the (I-1) vehicle diverts based upon the course change whereby the vehicle intercepts the target during the I-th coast.

DETAILED DESCRIPTION OF THE INVENTION

Figure 1:
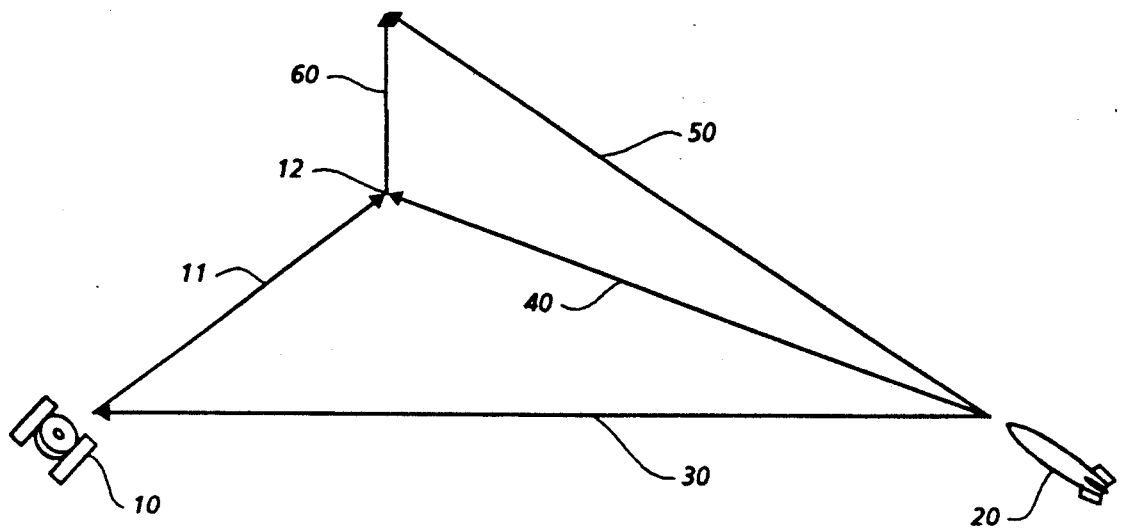
FIG. 1 is a diagrammatic view of the intercept geometry utilized by the method of the present invention in guiding an in-flight vehicle toward a target during the vehicle's terminal intercept phase of flight.

Referring now to the drawings and in particular to FIG. 1, the intercept geometry utilized by an in-flight vehicle 20 during its terminal intercept phase of flight, according to the method of the present invention, is shown. The terminal intercept phase of flight is entered when vehicle 20 acquires a target 10 and establishes a line-of-sight vector 30 to target 10. For purposes of the invention, target 10 is exhibiting a known or predictable thrust profile. The known or predictable thrust profile includes the case of zero-thrust or free-fall. Therefore, for purposes of description only, target 10 might be a non-thrusting, orbiting satellite and vehicle 20 might be a missile. However, the present invention is not limited to such a scenario. As will be readily apparent, the method might also be used to guide vehicle 20 to a docking with target 10.

During the terminal intercept phase of flight, vehicle 20 will undergo an alternating series of coasts and diverts. During each vehicle coast, vehicle 20 is non-thrusting and exhibits free-fall. During each vehicle divert, one of its thrusting motors (not shown) is fired and burned. Vehicle 20 is typically equipped with solid fuel motors having predetermined and fixed time/magnitude diverts or thrusting motor burns. However, it should be noted that the present invention is not restricted to vehicles which utilize fixed time/magnitude solid fuel motors.

Figure 2:
FIG. 2 is a time-line depicting the alternating series of vehicle coasts and diverts exhibited during the in-flight vehicle's terminal intercept phase of flight.

The number of coasts and diverts contained within the alternating series may vary and is not a constraint on the present invention. In most applications, the target 10 is acquired and is intercepted when the vehicle 20 is coasting. Accordingly, the terminal intercept phase of flight comprises I vehicle coasts and (I-1) vehicle diverts. This is shown graphically in FIG. 2 on a time-line where at t=0 the target is acquired, and at t=T the target is intercepted. In FIG. 2, "C" is indicative of a vehicle coast and "B" is indicative of a thrusting motor burn. Note that the time for each coast and burn need not be equal as shown and typically is not. Indeed the time-line of FIG. 2 is shown only for purposes of understanding the relationship of the vehicle coasts and burns.

Once target acquisition has occurred, line-of-sight vector 30 is established from historical measurements obtained during the first vehicle coast by a sensing device (not shown) mounted on vehicle 20. For purposes of the present invention, the sensing device need only be a passive sensing device such as an optical sensing device. Line-of-sight vector 30 lies approximately along the U-axis of a U-V-W coordinate system. The line-of-sight vector 30 and target trajectory 11 are used to estimate the relative position and velocity of target 10 and vehicle 20. These estimates may be achieved by any one of a variety of state-of-the art methods, including the use of a Kalman filter as described in U.S. Pat. No. 5,051,751, issued Sept. 24, 1991 and entitled "A Method of Kalman Filtering For Estimating the Position and Velocity of a Tracked Object."

Referring again to FIG. 1, the position and velocity estimates are used with conventional propagation techniques to determine an estimated time of impact at an estimated target impact position 12 along an estimated collision course 40. As will be readily apparent, the method of the present invention permits the generation of estimated time of impact using only passive optical sensing measurements.

While vehicle 20 is still in its coasting cycle, the method of the present invention next selects a course change for vehicle 20. The course change or offset trajectory 50 is intentionally offset from collision course 40 by a target vector offset 60. The magnitude of offset 60 is defined by the distance between vehicle 20 and target 10 when target 10, on its trajectory 11, is at a closest approach with vehicle 20 on offset trajectory 50. The magnitude of offset 60 is then used to compute the firing direction of the next sequential thrusting motor in the series to divert vehicle 20. The magnitude of offset 60 generally decreases with each vehicle coast in the series such that during the I-th coast, the (I-1)-th divert causes vehicle 20 to intercept target 10. However, it is to be understood that the magnitude of offset 60 need not decrease with each vehicle coast. Certain applications may require a large intermediate divert which would temporarily increase the magnitude of offset 60. Even in this case, the (I-1)-th divert will cause vehicle 20 to intercept target 10.

Interception can occur in one of two ways. If vehicle 20 is equipped with an intercept enhancement device (not shown), the determination of the magnitude of offset 60 need only approach zero for the (I-1)-th vehicle coast. The radius of the enhancement device will determine how close to zero the determination must approach. On the other hand, if vehicle 20 is not equipped with an intercept enhancement device, the magnitude of offset 60 determined during the (I-1)-th coast must be zero in order to place vehicle 20 on a collision course with target 10 during the I-th coast. In either case, interception will occur during the I-th coast.

Figure 3:
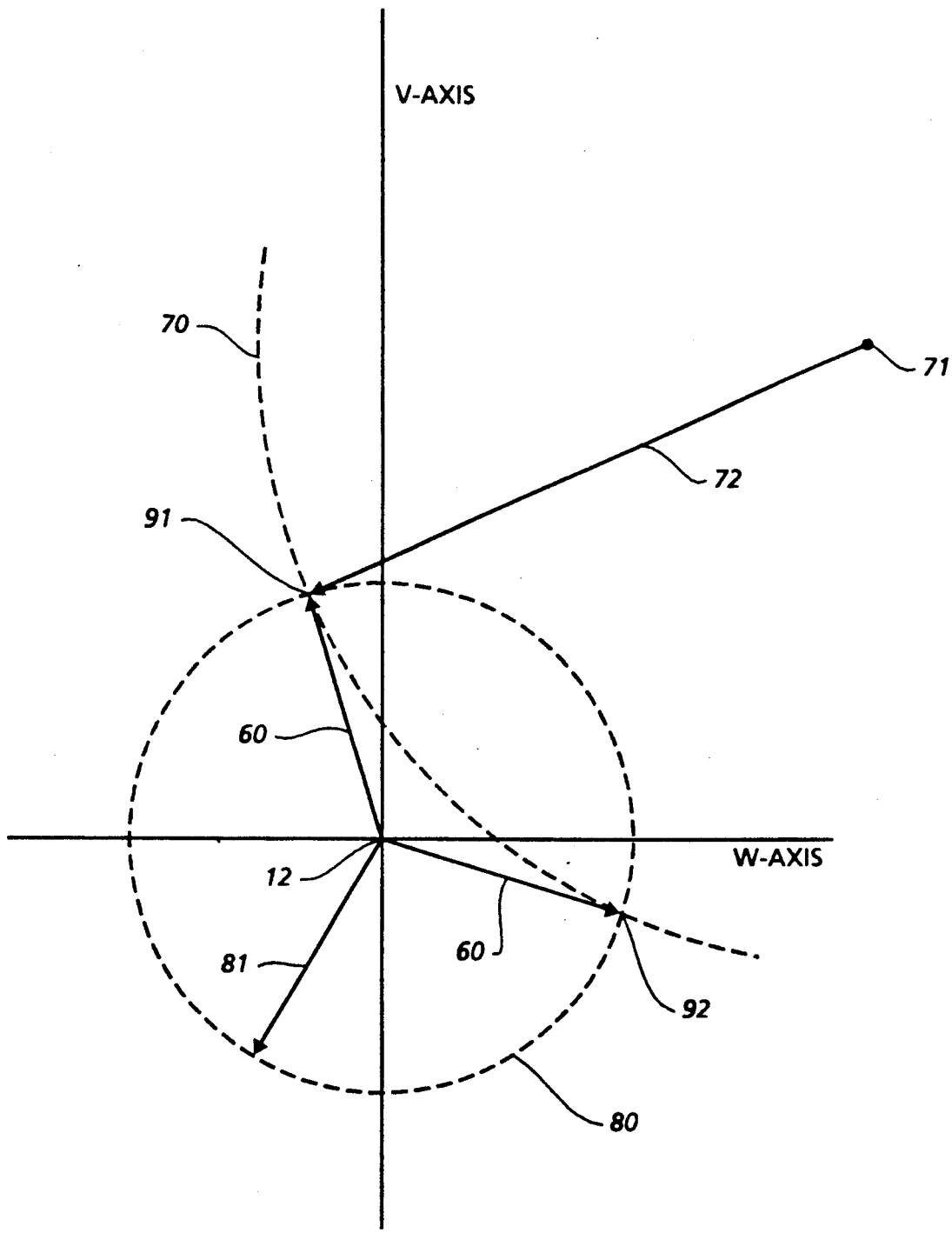
FIG. 3 is a diagrammatic view depicting the intersection of the possible miss circle and the desired offset circle in the V-W plane as determined by the method of the present invention during each vehicle coast period.

The method of achieving offset 60 will now be explained in greater detail with reference to FIGS. 1 and 3. FIG. 3 resides in the V-W plane of the U-V-W coordinate system and is perpendicular to the U-axis. Common elements with FIG. 1 will share common reference numerals. From the velocity of vehicle 20 and the fixed time and magnitude of the next sequential thrusting motor burn, a set of possible miss coordinates is generated. For example, if the next sequential thrusting motor burn is fired perpendicular to line-of-sight vector 30, the generated possible miss coordinates form a circle 70, only a portion of which is shown. Possible miss circle 70 lies in the V-W plane and is centered at a V-W plane closest approach position 71 achieved if the next sequential thrusting motor burn was not fired. Thus, radius 72 of possible miss circle 70 is determined by the magnitude of the next sequential thrusting motor burn. Possible miss circle 70 is indicative of all possible target misses achievable by the next sequential thrusting motor burn fired perpendicular to line-of-sight vector 30. By firing perpendicular to line-of-sight vector 30, the optical sensing device never has to turn away from target 10 thereby eliminating the need to reacquire target 10 after each burn. However, the method of the present invention is not so limited. If the next sequential thrusting motor burn were not fired perpendicular to line-of-sight vector 30, the generated possible miss coordinates would form a disk lying in the V-W plane. The disadvantage of this approach is that target 10 may have to be reacquired by the optical sensing device after each burn.

A set of desired offset coordinates or desired offset circle 80 is also provided in the V-W plane. Desired offset circle 80 may be determined by a variety of methods or may be predetermined for each of vehicle's coasts. Such predetermination would be possible if the vehicle 20 was undergoing a precise and predetermined schedule of burns with respect to the time of intercept. Typically, however, a method of determining the desired offset circle 80 is required as will be explained further hereinbelow.

The desired offset circle 80 is centered at the estimated target impact position 12 and is indicative of the desired target misses for the next sequential thrusting motor burn. Intersection points 91 and 92, where possible miss circle 70 intersects desired offset circle 80, are indicative of the two possible choices for target vector offset 60. Points 91 and 92 are indicative of an angle in the V-W plane that the thrust from the next sequential thrusting motor must be applied in order to place vehicle 20 on the course change or offset trajectory 50. This altered course places vehicle 20 on the desired offset circle 80. Then, during the vehicle coast following the next sequential thrusting motor burn, the possible miss circle 70 is regenerated and two new points of intersection with a new desired offset circle 80 are obtained. This cycle is repeated for each of the thrusting motor burns in the series. As vehicle 20 approaches target 10, the radius 81 of desired offset circle 80 decreases and either approaches zero or is equal to zero after the last thrusting motor burn as described above.

The radius 81 of desired offset circle 80 may be provided to the method of the present invention or may be determined in any one of a variety of ways. By way of example, radius 81 may be determined mathematically by the equation $$(\Delta t)(\Delta v)$$

where $\Delta t$ is the time it takes vehicle 20 to travel from the mid-point of the thrusting motor burn following the next sequential thrusting motor burn to the estimated target impact position 12, and $\Delta v$ is the change in velocity of vehicle 20 imparted by the thrusting motor burn following the next sequential thrusting motor burn. This predetermined calculation is made possible by the knowledge of the predetermined sequence of the fixed time/magnitude thrusting motors.

An assumption of the foregoing description is that vehicle 20 is not on collision course 40 with target 10 when target acquisition occurs. However, this may not always be the case. Should vehicle 20 be on collision course 40 at target acquisition, it would be necessary to provide a way to initially offset vehicle 20 from collision course 40 in order for the method of the present invention to proceed. Accordingly, a further step of burning an initializing thrusting motor to establish an initial set of desired offset coordinates may be required.

The advantages of the present invention are numerous. By intentionally creating an offset from the collision course, the time of impact can be determined, according to geometric triangulation methods, using only passive sensing device inputs. This reduces the complexity and weight of the vehicle by eliminating the need for complex laser or radar range finders. Furthermore, the method allows for a large margin of error. Even if the desired offset trajectory is not achieved on a particular divert, the method of the present invention can recover with the next divert. This is because the intersection of the desired offset circle with the possible miss circle is generally achievable by the next divert, thereby placing the vehicle right back on schedule.

In one embodiment, each thrusting motor burn is fired perpendicular to the line-of-sight. In this way, the optical sensing device does not have to turn away from the target at each burn and, consequently, does not have to reacquire the target after each burn. Furthermore, the method need only process sensor measurements during vehicle coasts thereby eliminating much of the vibration error usually associated with measurements obtained during the burns. The invention utilizes knowledge of the vehicle's predetermined and fixed time/magnitude thrusting motor burns to achieve a simple, in-flight guidance method to intercept a target. Thus, the method of the present invention will find great utility in the guidance of vehicles propelled by solid fuel motors.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method of guiding an in-flight vehicle toward an intercept with a target exhibiting a known or predictable thrust profile, comprising the steps of:
   a) acquiring the target by means of a sensing device mounted on the vehicle wherein said acquisition of the target is indicative of the vehicle entering a terminal intercept phase of flight during which time the vehicle will undergo an alternating series of I vehicle coasts and (I-1) vehicle diverts;
   b) providing, during the terminal intercept phase of flight, position and velocity information of the target with respect to the vehicle at least during each of the first (I-1) vehicle coasts;
   c) selecting a course change for the vehicle at least during the first (I-1) vehicle coasts, said course change being based upon said position and velocity information wherein said course change is offset from a collision course with the target, said offset having a magnitude defined by a distance between the vehicle and the target when a projected trajectory of the vehicle is at a closest approach with the target, wherein said offset magnitude during the I-th vehicle coast is: 1) related to the radius of an intercept enhancement device if the vehicle is equipped with same or 2) equal to zero if the vehicle is not equipped with an intercept enhancement device; and
   d) diverting the vehicle at each of the (I-1) vehicle diverts based upon said course change whereby the vehicle intercepts the target during the I-th coast.

2. A method of guiding a vehicle throughout its terminal intercept phase of flight during which time the vehicle will undergo an alternating series of I vehicle coasts and (I-1) vehicle diverts wherein said alternating series begins with a vehicle coast, said method further guiding the vehicle toward an intercept with a target exhibiting a known or predictable thrust profile, comprising the steps of:
   a) estimating, during each vehicle coast, relative position and velocity of the target with respect to the vehicle using navigational parameters measured by a sensing device mounted on the vehicle;

b) selecting, during each of the first (I-1) vehicle coasts, a course change of the vehicle based on said relative position and velocity estimates wherein said course change is offset from a collision course with the target, said offset having a magnitude defined by a distance between the vehicle and the target when a projected trajectory of the vehicle is at a closest approach with the target, wherein said offset magnitude during the I-th vehicle coast is: 1) related to the radius of an intercept enhancement device if the vehicle is equipped with same or 2) equal to zero if the vehicle is not equipped with an intercept enhancement device; and c) diverting, during each of the first (I-1) vehicle diverts, the vehicle according to said course change by means of thrust generated by solid fuel motors attached to the vehicle, wherein the generated thrust is of a predetermined magnitude and duration, whereby the vehicle intercepts the target during the I-th coast.

3. A method as in claim 2 wherein the navigational parameters include a line-of-sight vector measured by a passive optical sensing device.

4. A method as in claim 3 wherein said generated thrust is perpendicular to said line-of-sight vector.

5. A method of guiding an in-flight vehicle to an intercept with a target exhibiting a known or predictable thrust profile along a trajectory, wherein the vehicle is equipped with thrusting motors having predetermined, fixed time and magnitude burns that are intermittently fired according to a predetermined sequence for guiding the vehicle after target acquisition, comprising the steps of:

a) acquiring a target by means of a sensing device mounted on the vehicle, said target acquisition including the establishment of a line-of-sight vector from the vehicle to the target, wherein said line-of-sight vector is approximately along the U-axis of a U-V-W coordinate system;

b) estimating a collision course between the vehicle and the target based on the target trajectory and the line-of-sight vector, wherein said estimated collision course is indicative of an estimated target impact position based upon relative velocities of the vehicle and target;

c) generating possible miss coordinates based on the fixed time and magnitude of the next sequential thrusting motor burn from the predetermined sequence and the velocity of the vehicle, said possible miss coordinates forming a circle having its center at a V-W plane closest approach position achieved if said next sequential thrusting motor burn is never fired and being indicative of all possible target misses in the V-W plane achievable by said next sequential thrusting motor burn, wherein the V-W plane is perpendicular to the U-axis;

d) providing desired offset coordinates about said estimated target impact position, said desired offset coordinates forming a circle having its center at said estimated target impact position and being indicative of desired target misses in the V-W plane wherein said desired offset circle intersects said possible miss circle;

e) applying said next sequential thrusting motor burn to alter the course of the vehicle based on said intersection wherein said altered course places the vehicle in a V-W plane closest approach position that resides on said desired offset circle, said altered course having a magnitude defined by a distance between the vehicle and the target when a projected trajectory of the vehicle is at a closest approach with the target, wherein said altered course magnitude after the last thrusting motor burn is: 1) related to the radius of an intercept enhancement device if the vehicle is equipped with same or 2) equal to zero if the vehicle is not equipped with an intercept enhancement device; and f) performing steps b) through e) for each of the thrusting motor burns, whereby the vehicle intercepts the target after the last thrusting motor burn.

6. A method as in claim 5 wherein said desired offset circle has a radius whose magnitude is equal to $(\Delta t)(\Delta v)$, where $\Delta t$ is the time for the vehicle to travel from the mid-point of a thrusting motor burn following said next sequential thrusting motor burn to said estimated target impact position and $\Delta v$ is the change in velocity of the vehicle to be imparted by said following thrusting motor burn.

7. A method as in claim 5 wherein said step of acquiring further includes the step of burning at least one initializing thrusting motor for purposes of establishing an initial set of desired offset coordinates.

8. A method as in claim 5 wherein each of the thrusting motor burns is fired perpendicular to said line-of-sight vector.

* * * * *